United States Patent [19]
Oertel et al.

[11] Patent Number: 5,602,587
[45] Date of Patent: Feb. 11, 1997

[54] CORRECTION OF INFLUENCE OF ALTERNATING VOLTAGE COUPLING IN A SIGNAL CHAIN OF SCANNING OPTO-ELECTRONIC SENSORS

[75] Inventors: Dieter Oertel, Fürstenfeldbruck, Germany; Boris Zhukov, Mytistschi, Russian Federation

[73] Assignee: Deutsche Forschungsanstalt für Luft-und Raumfahrt e.V., Köln, Germany

[21] Appl. No.: 351,112

[22] Filed: Nov. 30, 1994

[30] Foreign Application Priority Data

Dec. 1, 1993 [DE] Germany ........................ 43 40 994.6

[51] Int. Cl.$^6$ ........................................ H04N 5/217
[52] U.S. Cl. .......................... 348/241; 348/162; 348/607; 250/214 RC
[58] Field of Search .................... 348/241, 243, 348/242, 244, 533, 607, 61, 162, 163, 164; 257/533; 250/214 RC; H04N 5/217

[56] References Cited

U.S. PATENT DOCUMENTS

| | | | |
|---|---|---|---|
| 4,498,105 | 2/1985 | Crawshaw | 358/213 |
| 4,602,291 | 7/1986 | Temes | 358/221 |
| 5,153,421 | 10/1992 | Tandon et al. | 250/208.1 |
| 5,349,380 | 9/1994 | Stein | 348/250 |

OTHER PUBLICATIONS

Becherer et al; *Digital restoration of ac-coupled infrared Images*, SPIE vol. 197 Modern Utilization of Infrered Technology V(1979) 161–169.

*Primary Examiner*—John K. Peng
*Assistant Examiner*—Ngoc-Yen Vu
*Attorney, Agent, or Firm*— Browdy and Neimark

[57] ABSTRACT

A method for correction of influence of alternating voltage coupling in a signal chain of scanning opto-electronic sensors on radiometric data thereof is carried out by firstly ascertaining, and storing, characteristic times from the time constant of a RC-circuit of the signal chain of the respective spectral channel, a line scanning frequency and a number of image elements per scanline. A preliminary correction in the form of a recursive inverse RC-filtering of the sampling values is then performed for each image element of a channel with its characteristic time, and the preliminary corrected image data are intermediately stored channel-by-channel and line-by-line. In the case of the use of a dark reference source completely independent of external radiation, corrected pixel values are computed immediately and directly on the basis of the preliminarily corrected and intermediately stored image data with the aid of dark reference signals present at the sensor output for each channel.

4 Claims, 5 Drawing Sheets

CORRECTION OF INFLUENCE OF ALTERNATING VOLTAGE COUPLING IN A SIGNAL CHAIN OF SCANNING OPTO-ELECTRONIC SENSORS

FIELD OF THE INVENTION

The present invention relates to a method for correction of influence of alternating voltage coupling in a signal chain of scanning opto-electronic sensors on radiometric image data thereof picked up in the solar spectral range and in the thermal spectral range during an aerocosmic remote reconnaisance of the surface of the earth, wherein the solar spectral range reaches from 0.4 to 3.0 meters and the thermal spectral range from 3 to 100 meters.

DESCRIPTION OF THE RELATED ART

Hitherto, signal values of image elements (pixels) were referred directly to reference signal levels, which are obtained outside—mostly in the edge region—of the scanned images, in the case of alternating voltage coupled, scanning opto-electronic aircraft and satellite sensors. This takes place in terms of circuit technique either in real time (on-line) or after a data recording within the data processing on the ground (off-line). Influences of the characteristic time constant(s) of the alternating voltage coupling as well as of the preceding pixel and reference signal level to the instantaneous pixel value are, in that case, left out of consideration. Due to the alternating voltage coupling in the signal chain of the opto-electronic system, a high-pass filtering takes place, which leads to varying image distortions in the case of different scanning frequencies and different image contents. These distortions are particularly disturbing when radiometrically absolute image measurement values are to be obtained by the opto-electronic sensor.

Internal black bodies or other homogeneous radiation sources are, as a rule, used as reference signal source in mechanically scanning opto-electronic image sensors. These sources radiometrically interact more or less with their environment depending on the construction type of the sensor and, particularly in aircraft sensors, these sources interact also convectively.

Thus, further possible errors in the obtaining of absolute radiometric image data are environmentally-caused fluctuations of the temperature of the reference sources or fluctuations of the external radiation incident on the reference sources.

SUMMARY OF THE INVENTION

It is therefore the object of the invention to create a method, which can be performed rapidly, for the correction of influence of the alternating voltage coupled signal chain of scanning opto-electronic sensors on the radiometric image measurement data obtained by these sensors, in which environmentally-caused fluctuations of the radiation-physical properties of the sensor inherent reference signal sources are taken into consideration.

According to a first aspect of the present invention there is provided a method for the correction of influences of the alternating voltage coupling in a signal chain of scanning opto-electronic sensors on radiometric image data obtained in the solar spectral range during an aerocosmic remote sensing of the surface of earth, characterised in that a) characteristic times are obtained from the time constant of RC-circuit of the respective spectral channel of the alternating voltage coupled signal chain, from the scan-line frequency and from the number of image elements (pixels) per scanline and then stored;

b) for each image element of a spectral sensor channel with its characteristic time for its alternating voltage coupled signal chain and with the knowledge of any constant off-set value of an analog-to-digital converter of the signal chain and for any desired initial value of an additive term, a preliminary correction is performed in the form of a recursive inverse RC-filtering of the sampled pixel values obtained at the output of the analog-to-digital converter, c) the recursively and inversely RC-filtered, preliminarily corrected image data are intermediately stored spectral-channel-by-spectral-channel and line-by-line, and d) in the case of use of a dark reference source which is completely independent of external radiation, corrected image sampling values are computed immediately and directly on the basis of the preliminarily corrected and intermediately stored image data with the aid of dark reference signals present at the sensor output for each channel.

According to a second aspect of the invention with respect to the solar spectral region there is provided a method corresponding to the first aspect, but in which step (d) is substituted as below:

e) in the case of the use of a dark reference source which is influenced by external radiation, corrected image pixel values are computed recursively on the basis of the preliminarily corrected and intermediately stored image data and with the aid of dark reference signals which are computed iteratively at the same time during the recursive computation itself for each channel;

f) a mean reflectivity, which is to be determined experimentally, of the dark reference source and the first iteration of a dark reference signal are used as reference values for the recursive computation of the corrected image pixel values for each spectral channel;

g) a running iteration of the dark reference signal is performed line-by-line during the recursive computation of the corrected image pixel values by means of a line-by-line forward sliding formation of a mean scene signal from m image line segments which fall into the field of view (FOV) of the dark reference source and with the use of a mean reflectivity; and h) not more than four iterations are needed for a recursive computation of the image pixel values in the solar spectral range when said mean reference source reflectivity is at most equal to 0.02 in order to obtain accuracies of at most equal to 0.2%, for example, for a dark image element which is surrounded by image elements that are ten times as bright.

According to a third aspect of the invention with respect to the thermal spectral region there is provided a method corresponding to the first aspect, but in which the step (d) is substituted as below:

i) in the case of use of a black body as a reference source, which is internally mounted in the sensor, and which is disposed at ambient temperature and is completely independent of external radiation, the corrected image pixel values are computed from the preliminarily corrected and intermediately stored image data with the aid of the black body signals measured by the sensor as well as with the aid of black body signal values computed each time from the sensor sensitivity in the sampling position of the scanner at the black body, the integration time, the assumption that the emissivity of the black body at the mean wavelength of the channel is equal to 1, and the Planck function (for the ambient temperature) averaged in the spectral channel.

According to a fourth aspect of the invention with respect to the thermal spectral region there is provided a method corresponding to the first aspect, but in which the step (d) is substituted as below:

j) in the case of use of a black body as a reference source, which is disposed at ambient temperature and influenced by external radiation, the corrected image pixel values are computed recursively on the basis of the preliminarily corrected image data and with the aid of the black body signals measured by the sensor as well as with the aid of the black body signal values which are computed iteratively at the same time during the recursive computation itself for each channel;

k) a mean reflectivity, which is to be determined experimentally, of the black body disposed at ambient temperature and the first iteration of the computed ideal black body signal value each time from the sensor sensitivity in the sampling position of the scanner at the black body, the integration time, and the Planck function (for the ambient temperature) ascertained in the spectral channel are used as reference values for the recursive computation of the corrected image pixel values for each spectral channel, and l) a running iteration of the computed black body value is performed line-by-line, during the recursive computation of the corrected pixel values by means of a line-by-line forward sliding formation of a mean scene signal form m image line segments which come into the field of view (FOV) of the black body disposed at ambient temperature and with the use of a mean reflectivity, which is to be ascertained experimentally, of the black body disposed at ambient temperature, wherein not more than four iterations are needed in the thermal spectral range for the recursive correction of the image pixel values, when said mean reflectivity is equal to 0.1 and the emissivity of the black body at the mean wavelength of the channel is equal to 0.9 in order to obtain accuracies of 0.2%, for example, for an object image element at a temperature of 280 K, which is surrounded by image elements at temperatures which are at least equal to 300 K.

By means of a method exemplifying the invention, for example, a raw data image consisting of 1000 by 1000 pixels can be corrected in respect of the radiometrically true association of the digitised voltage values of the image elements in a work station of the type "SUN SPARC Station 10" in a time of a few seconds. Such a method is applicable in the solar spectral region as well as in the thermal spectral region.

BRIEF DESCRIPTION OF THE DRAWING

Methods exemplifying the invention will now be more particularly described with reference to the accompanying drawings in which.

DETAILED DESCRIPTION OF THE PREFERRED EMBODIMENTS

In all the methods exemplifying the invention, the digitised raw data of the individual image elements of a scanned image line 1 produced by a sensor in each spectral channel i are initially subjected to an inverse RC filtering, for which the following parameters of the sensor must be known:

Time constant of the RC-circuit of the respective spectral channel i of the alternating voltage coupled signal chain: $\tau_{i,0}=R \cdot C$ (referred to the RC-circuit in the block schematic diagram of the signal chain illustrated in FIG. 1).

Scanline frequency $f_0$ of the scanner (number of the scanned image lines per second)

Number of the image elements (pixels) per line: p

Figure 1:
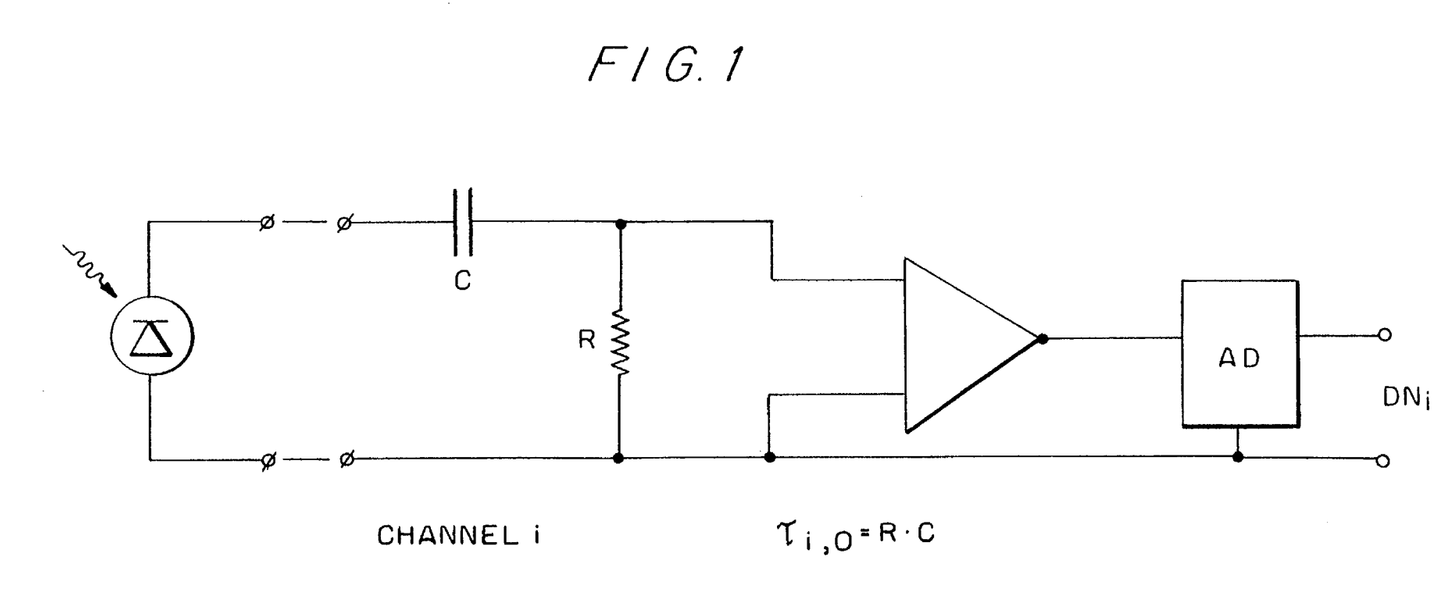
FIG. 1 is a block schematic diagram of an alternating voltage coupled signal chain of a scanning opto-electronic sensor.

Voltage off-set of the signal chain: $DN_0$—Initial value of the analog-to-digital converter output when no input signal is present at the analog-to-digital converter; (FIG. 1).

In the method exemplifying the invention, the characteristic time $\tau_i$ is initially determined from the parameters $\tau_{i,0}$, $f_0$ and p according to equation (1):

$$\tau_i = \tau_{i,0} \cdot f_0 \cdot p \qquad (1)$$

Figure 2:
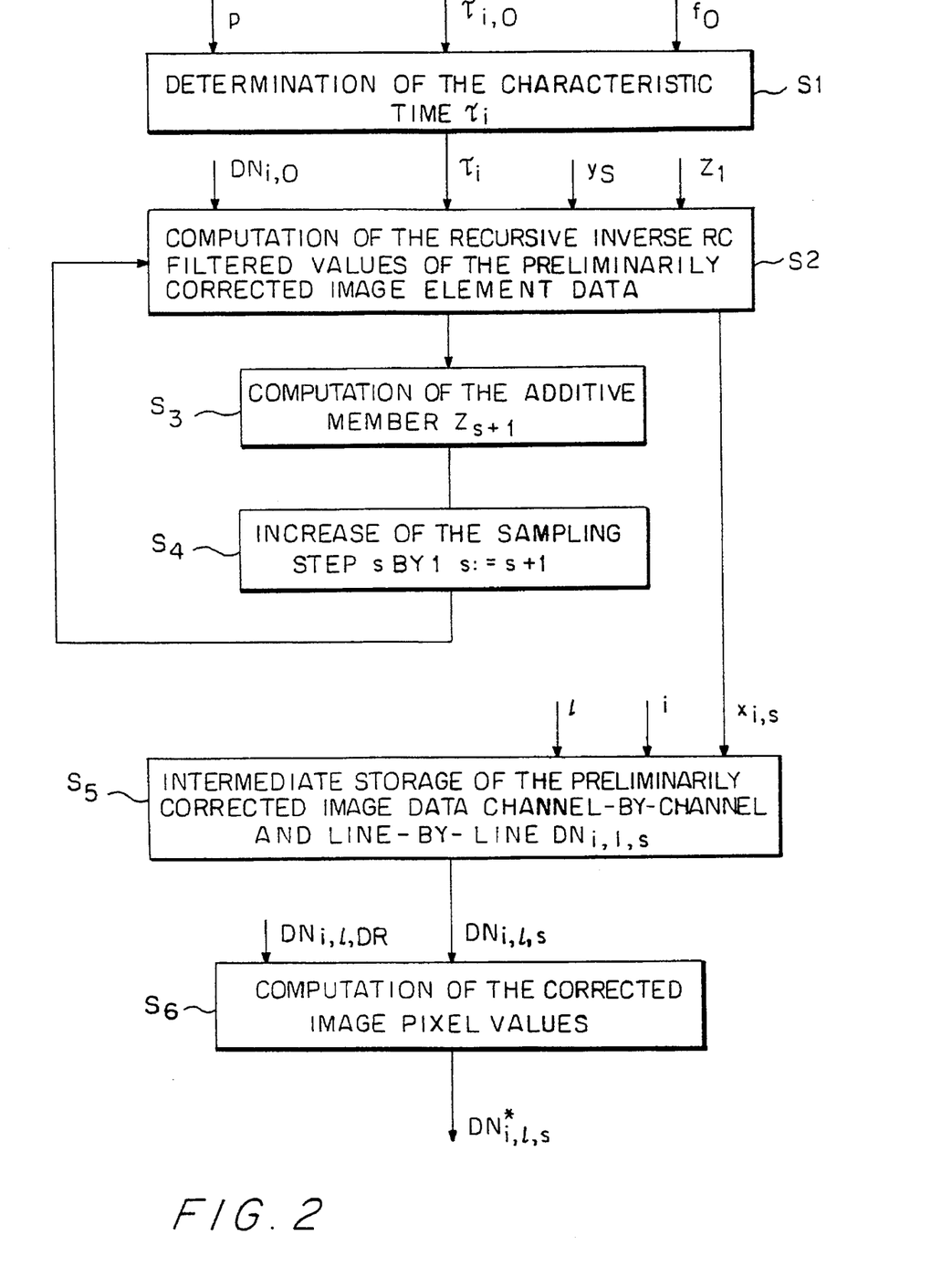
FIG. 2 is a flow chart exemplifying the first aspect of the invention, for correction of influence of such signal chain for the solar spectral range (variant a)

This is denoted by step S1 in a first flow chart of FIG. 2.

In the method exemplifying the invention, the digital raw data $y_s$ supplied by the analog-to-digital converter are converted into digital preliminarily corrected image data $x_s$ always separately for each spectral channel i respectively for the sampling steps s=1, 2, 3, ... p of each image line with the aid of an inverse RC-filtering according to equation (2)

$$x_s = (y_s - DN_0) + (1 - e^{-1/\tau}) \sum_{k=1}^{s-1} (y_s - DN_0) + Z_1 \qquad (2)$$

wherein is started with s=1 and $Z_1$ can be chosen freely, for instance, $Z_1$ may be set to zero. It defines the unknown off-set of the reconstructed signal. This unknown off-set is removed using dark reference signals as described in the text below.

In the correction method exemplifying the invention, a recursive computing algorithm according to equation (3) is used for the determination of $Z_s$ by equation (3). $Z_s$ is iteratively calculated beginning with S=1.

$$x_s = (y_s - DN_0) + (1 - e^{-1/\tau}) \cdot Z_s$$

$$Z_{s+1} = (y_s - DN_0) + Z_s$$

$$s := s+1 \qquad (3)$$

In the flow chart of FIG. 2, these are the steps S2, S3 and S4. The number of the repeated passages through the steps S2 to S4 exactly corresponds with the number of the sampled image elements in one line. The values $x_s$ are stored intermediately ordered according to channel number i and line number l, as indicated for step S5 of the flow chart of FIG. 2.

In the case of a method for the solar spectral range, the subtraction of dark reference values $DN_{i,l,DR}$ from the intermediately stored, preliminarily corrected image data $DN_{i,l,s}$ is performed in the next step, for which two variants a and b of this procedure are possible in dependence on the construction type of the sensor and on the arrangement of the dark reference source:

Variant a according to equation (4) is to be used when the dark reference source produces a radiation signal independently of the image signal $DN_{i,l,s}$, which is, for example, the case when the reference source is arranged in the scanner housing in a manner where it is protected completely against external light incidence:

$$DN_{i,l,s}{}^* = DN_{i,l,s} - DN_{i,l,DR} \tag{4}$$

The variant a for the correction of the image scanning value in L the solar spectral range is then completed by step S6 of the flow chart of FIG. 2.

Variant b according to equation (5) is to be used when the dark reference source produces a radiation signal influenced by the image signal $DN_{i,l,s}$, which is, for example, the case when the reference source is arranged externally of the scanner housing.

$$DN_{i,l,s}{}^* = (DN_{i,l,s} - DN_{i,l,DR}) + DN_{i,l,DR}{}^* \tag{5}$$

where in $DN_{i,l,DR}{}^*$ is determined according to equation (6)

$$DN_{i,l,DR}{}^* = \overline{\rho}_i \cdot \overline{DN}_{i,l_m}{}^* \tag{6}$$

$\overline{DN}{}^*_{i,l_m}$ is the mean scene signal from m image lines arranged one beside the other, wherein m is to be chosen according to the realised field of view (FOV) of the reference source onto the image scene; and $\overline{\rho}i$ is the mean reflectivity value of the reference source referred to the centre wavelength of the respective spectral channel i.

Variant b begins in a second flow chart (FIG. 3) initially with step S7, in which the mean reflectivity of the reference source ($\rho_i$) is defined before on the basis of experimental measurements for each spectral channel of the sensor.

Figure 3:
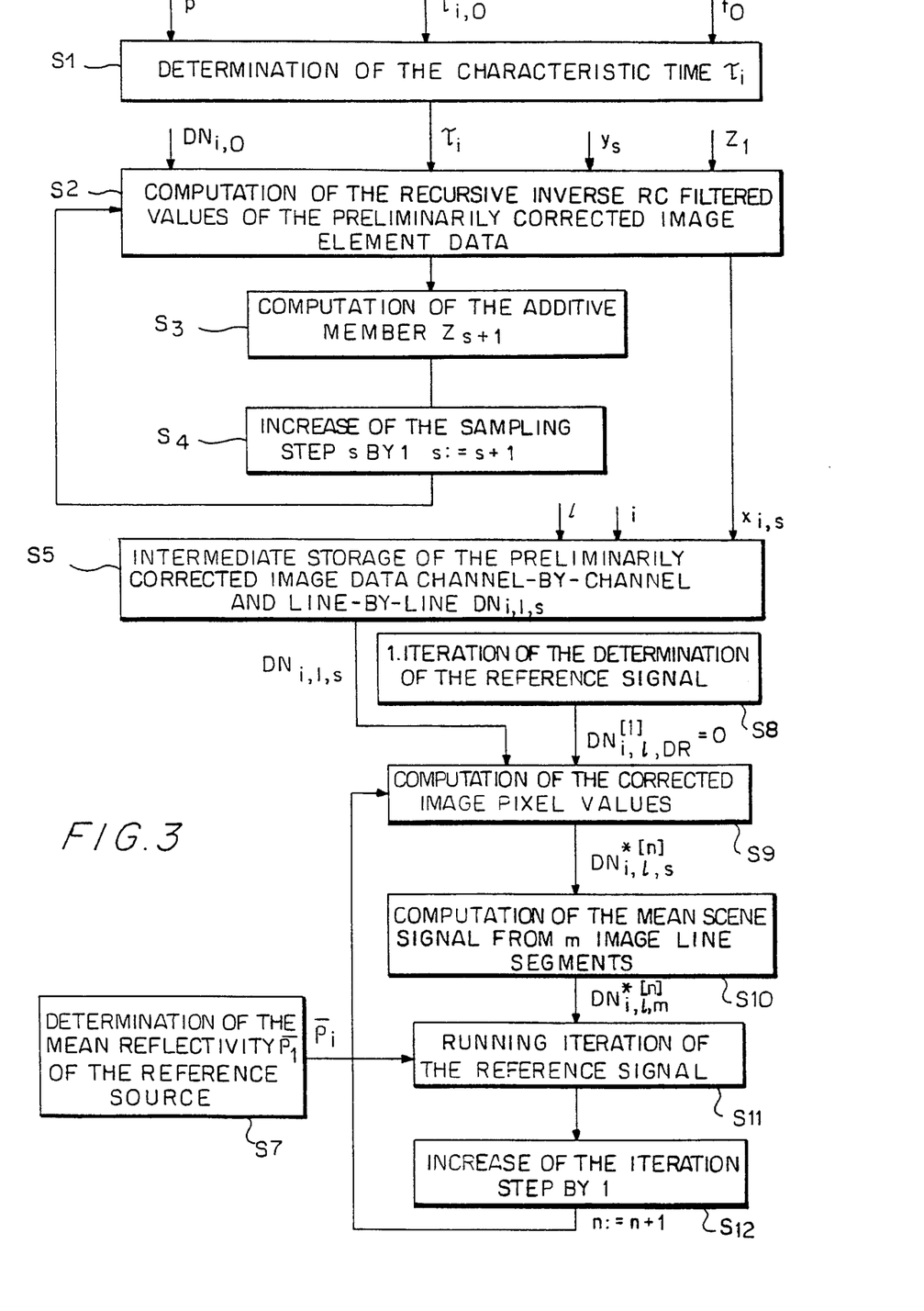
FIG. 3 is a flow chart exemplifying the second aspect of the invention, for correction of influence of such signal chain for the solar spectral range (variant b)

Including the first iteration (n=1)

$$DN^{*[1]}_{i,l,DR} = 0$$

(step S8 of the flow chart of FIG. 3), a recursive computing algorithm according to equation (7) is realised on the basis of the equations (5) and (6):

$$DN^{*[n]}_{i,l,s} = (DN_{i,l,s} - DN_{i,l,DR}) + DN^{*[n]}_{i,l,DR} \tag{7}$$

$$\overline{DN}^{*[n]}_{i,l_m} = \frac{1}{M} \cdot \sum_{l,s' \in FOV} DN^{*[n]}_{i,l,s}$$

$$DN^{*[n+1]}_{i,l,DR} = \overline{\rho}_i \cdot \overline{DN}^{*[n]}_{i,l_m}$$

$$n := n + 1$$

wherein $M = l \cdot s^1$ and $S^1 \leq s$

In the flow chart of FIG. 3, these are the steps S8 to S11.

With this recursive method of the variant b, an accuracy of 0.2% is achieved, for example, with only n=4 iterations under the following exemplary conditions:

2% mean reflectivity of the reference source, ratio of object image element reflectivity to image background reflectivity =0.1, i.e. a dark object image element (i, l, s) in the channel i of the scanline l at the sampling point s is surrounded by other image elements ten times as bright.

This correction accuracy was proved by real image data of an airborne imaging spectrometer.

In the methods exemplifying the invention, the digitised raw data produced by the sensor in the thermal spectral range of each of all individual elements s of a scanned image line l in each spectral channel i are initially subjected to an inverse RC-filtering identically with the afore-described manner of procedure in the solar spectral range. As described for the case of the correction in the solar spectral range, the characteristic time $\tau_i$ is determined according to equation (1) for the spectral channel (step S1 in the third flow chart of FIG. 4).

Figure 4:
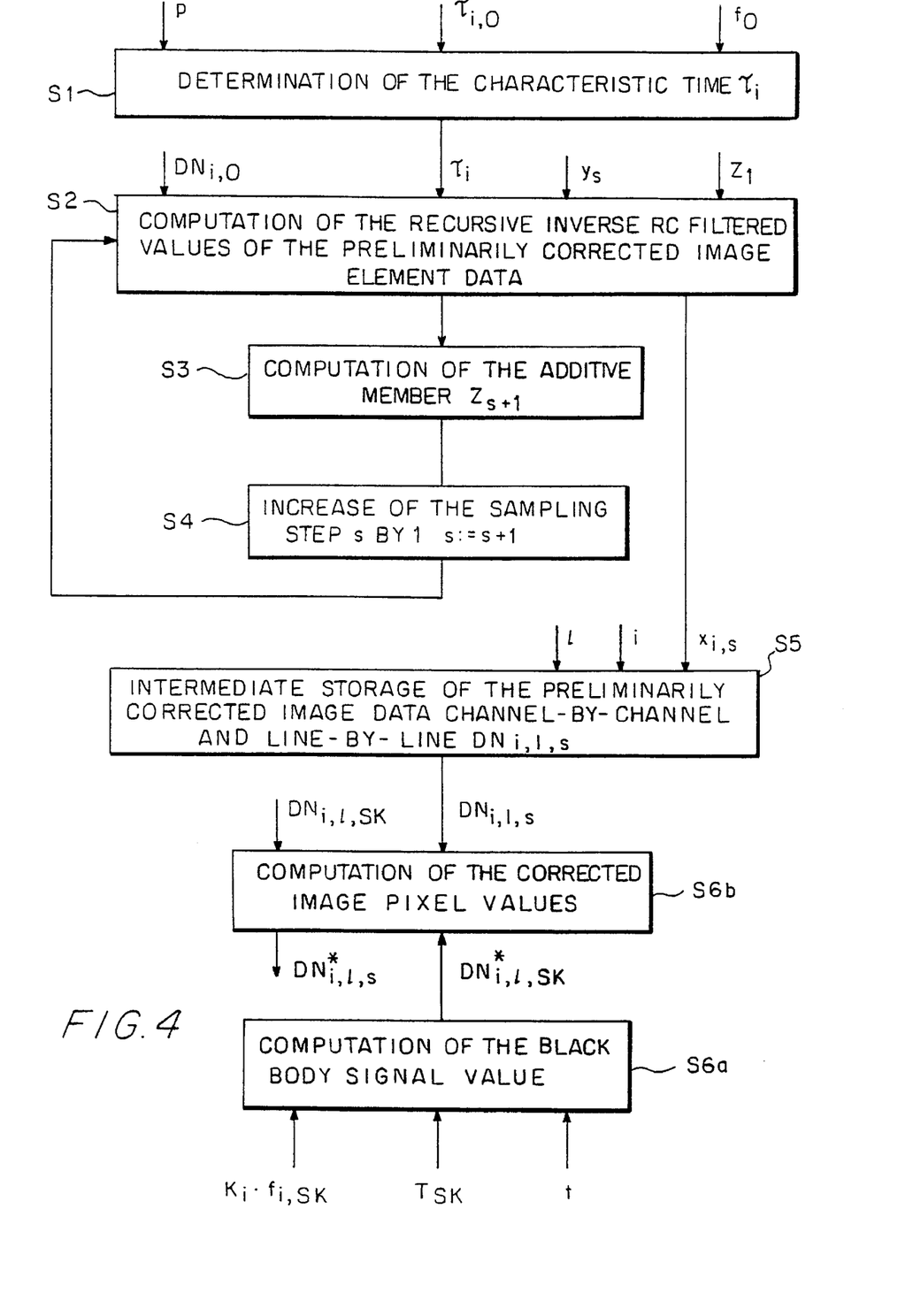
FIG. 4 is a flow chart exemplifying the third aspect of the invention, for correction of influence of such signal chain for the thermal spectral range (variant a')

The inverse RC-filtering equation (2) is realised by the computing algorithm according to equation (3) identically with the manner of the procedure in the solar spectral range (steps S2, S3 and S4) in the flow chart of FIG. 4). The number of the repeated passages through the steps S2, S3 and S4 corresponds exactly to the number of the sampled image elements in one line.

In the method for the thermal spectral range, the black body reference values $DN_{i,l,SK}$ of the black radiator, which is internal of the sensor and disposed at ambient temperature, are subtracted from the intermediately stored, perliminarily corrected image data $DN_{i,l,s}$ in the next step, wherein two variants of this procedure are to be performed in dependence on the mode of construction of the sensor and the arrangement of the black radiator internal of the sensor:

Variant a' according to the equations (8) and (9) is to be applied when the black body source, which is internal of the sensor and disposed at ambient temperature, produces a radiation signal independent of the image signal $DN_{i,l,s}$ which is, for example, the case when this black body is arranged in the scanner housing to be completely protected against external radiation:

$$DN_{i,l,s}{}^* = (DN_{i,l,s} - DN_{i,l,SK}) + DN_{i,l,SK}{}^* \tag{8}$$

and $$DN_{i,l,SK}{}^* = K_i \cdot f_{i,SK} \cdot t \cdot B(i, T_{SK}) \tag{9}$$

wherein $K_i$ denotes the absolute sensitivity of the spectral channel i of the sensor for the sampling angle 0°, $f_{i,SK}$ denotes the relative dependence of the sensitivity of the spectral channel i of the sensor on the sampling angle, here at the sampling position of the black body SK, t denotes the integration time per image element (pixel), and $B(i, T_{SK})$ denotes the Planck function for the temperature of the black body averaged over the spectral range i.

The correction of the sampling values in the case of variant a' takes place by the equations (8) and (9), which is denoted by the steps S6a and S6b in the flow chart of FIG. 4.

Variant b' according to the equations (10) and (11) is to be applied when the black body source, which is arranged externally to the sensor and disposed at ambient temperature, produces a radiation signal influenced by the image signal $DN_{i,l,s}$, which is, for example, the case when the black body is arranged externally of the scanner housing:

$$DN_{i,l,s}{}^* = (DN_{i,l,s} - DN_{i,l,SK}) + DN_{i,l,SK}{}^* \tag{10}$$

and $$DN_{i,l,SK}{}^* = K_i \cdot f_{i,SK} \cdot t \cdot \epsilon_i^{SK} \cdot B(i, T_{SK}) +$$

$$\bar{\rho}_i^{SK} \cdot \overline{DN}_{i,l,m}^* + K_i \cdot f_{i,SK} \cdot t \cdot \bar{\rho}_i^{SK(a)} \cdot B(i,T_a) \quad (11)$$

wherein $K_i$ denotes the absolute sensitivity of the spectral channel i of the sensor at the sampling angle 0°, $f_{i,SK}$ denotes the relative dependence of the spectral channel i of the sensor on the sampling angle, here at the scanning position of the black body SK, t denotes the integration time per image element (pixel), $\epsilon_i^{SK}$ denotes the emissivity of the black body at the mean wavelength of the channel i, $B(i,T_{SK})$ denotes the Planck function averaged over the spectral range i for the temperature of the black body, $DN^*_{i,l,m}$ denotes the mean scene signal of m image line segments arranged one beside the other, wherein m is to be chosen according to the realised field of view (FOV) of the black body onto the image scene, $\bar{\rho}_i^{SK}$ denotes the mean bidirectional reflectivity value of the black body referred to the mean wavelength of the respective spectral channel i, and $\bar{\rho}_i^{SK(a)}$ denotes the effective reflectivity value of the black body referred to the mean wavelength of the respective spectral channel i.

Figure 5:
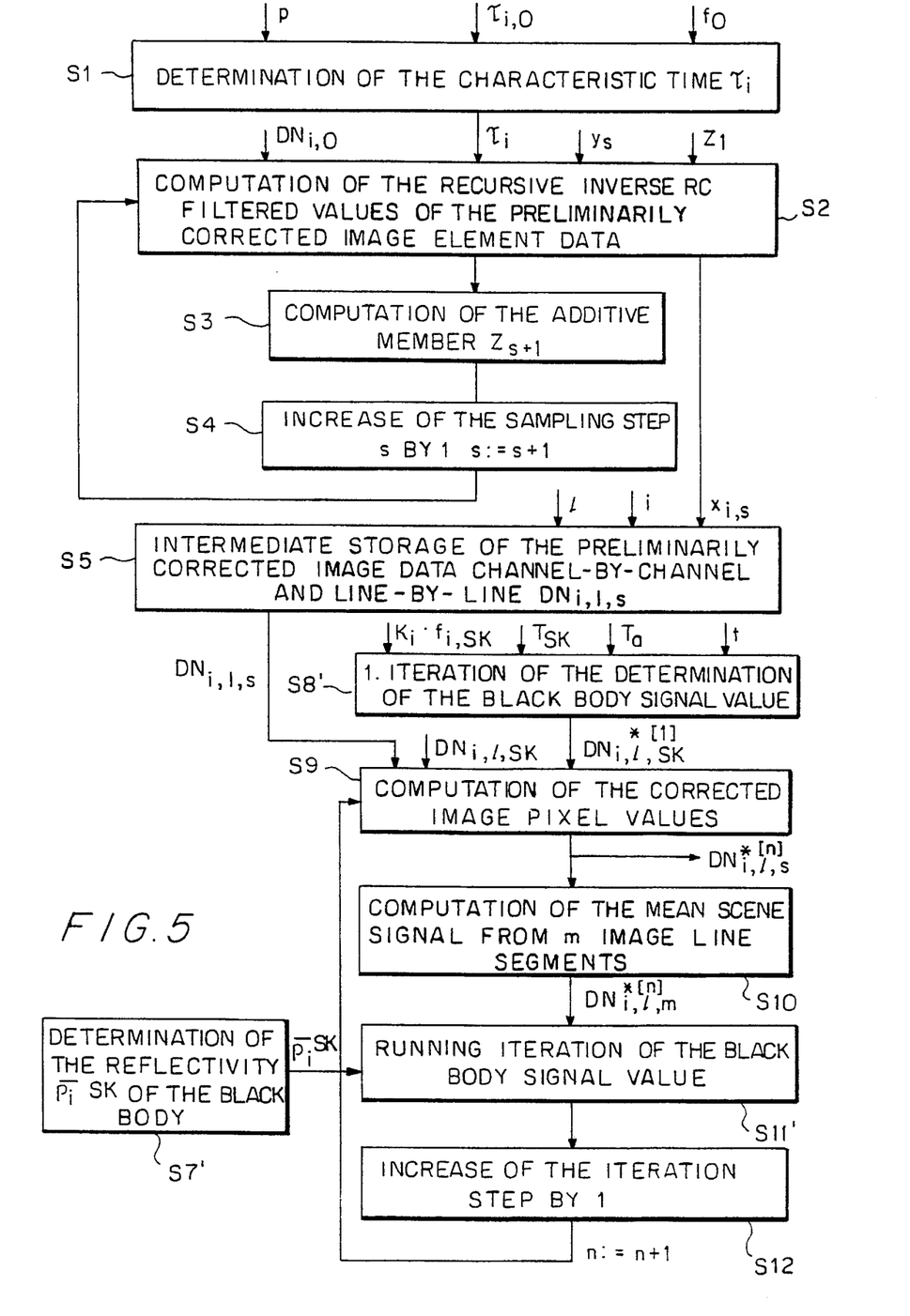
FIG. 5 is a flow chart exemplifying the fourth aspect of the invention, for correction of influences of such signal chain for the thermal spectral range (variant b').

In the case of the variant b', the mean reflectivity values $\bar{\rho}_i^{SK}$ of the black body, which is arranged externally to the sensor and disposed at ambient temperature, are to be determined experimentally for the thermal spectral channels of the sensor, which is denoted by step S8' in the fourth flow chart (5).

For the correction of the image sampling values according to variant b' and including the first iteration (n=1) according to equation (12)

$$DN_{i,l,s}^* = K_i \cdot f_{i,SK} \cdot t \cdot [\epsilon_i^{SK} \cdot B(i,T_{SK}) + \bar{\rho}_i^{SK(a)} \cdot B(i,T_a)] \quad (12)$$

a recursive computing algorithm according to equation (13) is realised on the basis of the equations (10) and (11).

$$DN_{i,l,s}^{*[n]} = (DN_{i,l,s} - DN_{i,l,DR}) + DN_{i,l,DR}^{*[n]} \quad (13)$$

$$\overline{DN}_{i,l,m}^{*[n]} = \frac{1}{M} \cdot \sum_{l,s \in FOV} DN_{i,l,s}^{*[n]}$$

$$DN_{i,l,SK}^{*[n+1]} = K_i \cdot f_{i,SK} \cdot t \cdot [\epsilon_i^{SK} \cdot B(i,T_{SK}) + \bar{\rho}_i^{SK(a)} \cdot B(i,T_a)] + \bar{\rho}_i^{SK} \cdot \overline{DN}_{i,l,m}^{*[n]}$$

$$n: = n + 1$$

wherein $M = l \cdot s^1$ and $s^1 \leq s$

In the flow chart of FIG. 5, this corresponds to the steps S9 to S12.

For a relatively unfavourable case, for example, an accuracy of the correction of 0.2% with n at most equal to 4 interations is achieved by the method according to variant b' under the following exemplary conditions:

10 to 20% reflectivity of the black radiator, for example at a wavelength of nine micrometers, and object image element temperature lower by 20 K than the image background temperature of 300 K, i.e. a cold object as an image element (i, l, s) in the channel i of the line l at the sampling point s is disposed in the surroundings of other image elements warmer by 20 K.

In the methods exemplifying the invention for the correction of influences of alternating voltage coupling in the signal chain of scanning opto-electronic sensors on radiometric image data obtained in the solar and thermal spectral range during an aerocosmic remote sensing of the surface of the earth, the advantages mentioned below are achieved:

A reduction in contrast, which is caused by the alternating voltage coupling, of uncorrected raw data of the sensor is eliminated completely by the recursive inverse RC filtering, which can also be denoted as preliminary correction, and by the subsequent recursive-iterative computation of the corrected image sampling values.

With the application of the recursive inverse RC-filtering, which is also denoted as preliminary correction, and the application of the following recursive-iterative computation of the corrected image sampling values, it is possible to use substantially smaller time constants $\tau_{i,0}$ of the RC-circuit in alternating voltage coupled signal chains of the channels of scanning opto-electronic sensors than it is absolutely necessary in the case of the subsequent raw data processing with direct reference of the signal values of the image elements to reference signal levels, which corresponds to the previous state of the art, and is required for comparable radiometric requirements on the image data of the sensor, which in turn leads to a better utilisation of the dynamic range of the analog-to-digital converter of the signal chain.

In the case of the application of the recursive inverse RC filtering, which is likewise again denoted as preliminary correction, and the subsequent recursive iterative computation of the corrected image sampling values, accuracies in the order of magnitude of the resolution of the analog-to-digital converter are achieved on the restoration of the relative radiometric pixel signals. Thereagainst, in the case of the raw data processing with direct reference of the signal values of the image elements to reference signals, as is the case for the previous state of the art, occure errors in the brightness signal of the dark objects of up to 100 percent or arise errors in the order of magnitude of, for example, five percent of the entire dynamic range of the scene (or of the analog-to-digital converter scale) in the case of a strong contrast in the image line, in particular for small dark objects which are surrounded by a bright background of large area. In the solar spectral range, this concerns, for example, spectral brightness values of a relatively narrow (dark) river which flows through a ripe (bright) cornfield.

We claim:

1. Method for correction of influence of the alternating voltage coupling in a signal chain of scanning opto-electronic sensors on radiometric image data obtained in the solar spectral range during aerocosmic remote sensing of the earth surface, comprising the steps of a) determining and storing characteristic times ($\tau_i$) of a time constant ($\tau_{i,0}$) of a RC-circuit of a respective spectral channel (i) of the alternating voltage coupled signal chain, a scanline frequency ($f_0$) and a number of pixels per scanline (p) (step S1), b) carrying out, for each pixel of a channel (i) with its characteristic time ($\tau_i$) of the signal chain and with knowledge of any constant off-set value of an analog-to-digital converter of the signal chain and any desired initial value of an additive term, a preliminary correction in the form of a recursive inverse RC-filtering of sampled pixels obtained at the output of the analog-to-digital converter (steps S1-S4), c) intermediately storing the preliminarily corrected by an inverse RC-filtering image data channel-by-channel and line-by-line, (step S5), and d) in the case of use of a dark reference source free of influence by external radiation, computing corrected image sampling values immediately and directly on the basis of the preliminarily corrected and intermediately stored image data and with the aid of dark reference signals present at an output of the opto-electronic sensor for each channel.

2. Method for correction of influence of the alternating voltage coupling in a signal chain of scanning opto-electronic sensors on radiometric image data obtained in the solar spectral range during aerocosmic remote sensing of the earth surface, comprising the steps of a) determining and storing characteristic times ($\tau_i$) of a time constant ($\tau_{i,0}$) of a RC-circuit of a respective spectral channel (i) of the alternating voltage coupled signal chain, a scanline frequency ($f_0$) and a number of pixels per scanline (p) (step S1), b) carrying out, for each pixel of a channel (i) with its characteristic time ($\tau_i$) of the signal chain and with knowledge of any constant off-set value of an analog-to-digital converter of the signal chain and any desired initial value of an additive term, a preliminary correction in the form of a recursive inverse RC-filtering of sampled pixels obtained at the output of the analog-to-digital converter (steps S1-S4), c) intermediately storing the preliminarily corrected by an inverse RC-filtering image data channel-by-channel and line-by-line (step S5), e) in the case of use of a dark reference source influenced by external radiation, computing corrected sampling values recursively on the basis of the preliminarily corrected and intermediately stored image data and with the aid of dark reference signals computed iteratively at the same time during the recursive computation for each channel (steps S8-S12), f) using an experimentally determined mean reflectivity of the dark reference source and the first iteration of a dark reference signal used as reference values for the recursive computation of the corrected pixels for each channel, and g) carrying out a running iteration of the dark reference signal line-by-line, during the recursive computation of the corrected pixels, by means of a line-by-line forward sliding formation of a mean scene signal from m image line segments which come into the field of view (FOV) of the dark reference source and with the use of a mean reflectivity, wherein not more than four iterations are needed for a recursive computation of the pixels when the mean reflectivity (phd i) is at most equal to 0.02 in order to obtain accuracies of at most equal to 0.2 percent in the solar spectral range, for example, for a dark pixel which is surrounded by pixels that are ten times as bright.

3. Method for correction of influence of the alternating voltage coupling in a signal chain of scanning opto-electronic sensors on radiometric image data obtained in the thermal spectral range during aerocosmic remote sensing of the earth surface, comprising the steps of a) determining and storing characteristic times ($\tau_i$) of a time constant ($\tau_{i,0}$) of a RC-circuit of a respective spectral channel (i) of the alternating voltage coupled signal chain, a scanline frequency ($f_0$) and a number of pixels per scanline (p) (step S1), b) carrying out, for each pixel of a channel (i) with its characteristic time ($\tau_i$) of the signal chain and with knowledge of any constant off-set value of an analog-to-digital converter of the signal chain and any desired initial value of an additive term, a preliminary correction in the form of a recursive inverse RC filtering of sampled pixels obtained at the output of the analog-to-digital converter (steps S1-S4), c) intermediately storing the preliminarily corrected by an inverse RC-filtering image data channel-by-channel and line-by-line, i) in the case of use of a black body as a reference source, which is disposed internally of the opto-electronic sensor and which is at ambient temperature and free of the influence from external radiation computing corrected pixels from the preliminarily corrected and intermediately stored image data and with the aid of the black body signals measured by the sensor ($DN_{i,l,SK}$) and on black body signal values computed from the sensor sensitivity ($K_i \cdot f_{i,SK}$) in a sampling position of the scanner at the black body, the integration time, the assumption that the emissivity of the black body at a mean wavelength of the channel is equal to 1, and a Planck function (for the ambient temperature) averaged in the spectral channel (steps S6a,S6b).

4. Method for correction of influence of the alternating voltage coupling in a signal chain of scanning opto-electronic sensors on radiometric image data obtained in the thermal spectral range during aerocosmic remote sensing of the earth surface, comprising the steps of a) determining and storing characteristic times ($\tau_i$) of a time constant ($\tau_{i,0}$) of a RC-circuit of a respective spectral channel (i) of the alternating voltage coupled signal chain, a scanline frequency ($f_0$) and a number of pixels per scanline (p) (step S1), b) carrying out, for each pixel of a channel (i) with its characteristic time ($\tau_i$) of the signal chain and with knowledge of any constant off-set value of an analog-to-digital converter of the signal chain and any desired initial value of an additive term, a preliminary correction in the form of a recursive inverse RC-filtering of sampled pixels obtained at the output of the analog-to-digital converter (steps S1-S4), c) intermediately storing the preliminary corrected by an inverse RC-filtering image data channel-by-channel and line-by-line (step S5), j) in the case of use of a black body as a reference source, which is at ambient temperature and influenced by external radiation computing corrected pixels recursively on the basis of the preliminarily corrected image data and with the aid of the black body signals measured by the opto-electronic sensor as well as with the aid of black body signal values which are computed iteratively at the same time during the recursive computation itself for each channel (steps S10-S12), k) using an experimentally determined mean reflectivity of the black body disposed at ambient temperature and the first iteration of an ideal black body signal value computed from sensor sensitivity in a sampling position of the scanner at the black body, an integration time and a Planck function (for the ambient temperature) ascertained in the spectral channel used as reference values for the recursive computation of the corrected pixels for each channel, and l) carrying out a running iteration of the computed black body value line-by-line, during the recursive computation of the corrected pixel values, by means of a line-by-line forward sliding formation of a mean scene signal from m image line segments which come into the field of view (FOV) of the black body and with the use of an experimentally determined mean reflectivity of the black body (step S12), wherein not more than four iterations are needed in the thermal spectral range of the recursive correction of the pixels when the mean reflectivity of the black body is equal to 0.1 and the emissivity of the black body at a mean wavelength of the channel is equal to 0.9 in order to obtain accuracies of 0.2% for example, for an pixel with a temperature of 280 K which is surrounded by pixels with temperature of at most 300 K.

* * * * *